(12) United States Patent
Park et al.

(10) Patent No.: US 11,538,632 B2
(45) Date of Patent: Dec. 27, 2022

(54) DIELECTRIC MATERIAL, METHOD OF PREPARING THE SAME, AND DEVICE COMPRISING THE DIELECTRIC MATERIAL

(71) Applicant: Samsung Electronics Co., Ltd., Suwon-si (KR)

(72) Inventors: Hyeon Cheol Park, Hwaseong-si (KR); Daejin Yang, Seoul (KR); Doh Won Jung, Seoul (KR); Taewon Jeong, Yongin-si (KR); Giyoung Jo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/368,037

(22) Filed: Jul. 6, 2021

(65) Prior Publication Data
US 2022/0246353 A1 Aug. 4, 2022

(30) Foreign Application Priority Data

Jan. 29, 2021 (KR) .......................... 10-2021-0013468

(51) Int. Cl.
*H01G 4/12* (2006.01)
*H01B 3/12* (2006.01)
(Continued)

(52) U.S. Cl.
CPC ............. *H01G 4/1227* (2013.01); *H01B 3/12* (2013.01); *H01B 19/00* (2013.01);
(Continued)

(58) Field of Classification Search
CPC ............... H01G 4/1227; H01G 4/1245; H01G 4/1254; H01G 4/1263; H01G 4/30; H01B 3/12; H01B 19/00
See application file for complete search history.

(56) References Cited

U.S. PATENT DOCUMENTS

| 4,468,432 A | 8/1984 | Matsukura et al. |
| 9,487,445 B2 * | 11/2016 | Natsui .................... C04B 35/47 |
| 9,905,749 B2 * | 2/2018 | Katoh .................. H01L 41/187 |

(Continued)

FOREIGN PATENT DOCUMENTS

| CN | 001285539 C | 11/2006 |
| CN | 109095920 A | 12/2018 |

(Continued)

OTHER PUBLICATIONS

R. Wayne Johnson, et al.," The Changing automotive Environment: High-Temperature Electronics," IEEE, vol. 27, No. 3, Jul. 2004.

(Continued)

*Primary Examiner* — Dion R. Ferguson
(74) *Attorney, Agent, or Firm* — Harness, Dickey & Pierce, P.L.C.

(57) ABSTRACT

Provided are a dielectric material including a composite represented by Formula 1, a device including the same, and a method of preparing the dielectric material:

$$xAB_3 \cdot (1-x)(Bi_aNa_b)TiO_3 \qquad \text{[Formula 1]}$$

wherein, in Formula 1, A is at least one element selected from among lanthanum group elements, rare earth metal elements, and alkaline earth metal elements,
B is at least one element selected from transition metal elements,
$0.1 < x < 0.5$, $0 < a < 1$, $0 < b < 1$, and $a+b=1$.

25 Claims, 7 Drawing Sheets

(51) Int. Cl.
*H01G 4/30* (2006.01)
*H01B 19/00* (2006.01)

(52) U.S. Cl.
CPC ......... *H01G 4/1245* (2013.01); *H01G 4/1254* (2013.01); *H01G 4/1263* (2013.01); *H01G 4/30* (2013.01)

(56) References Cited

U.S. PATENT DOCUMENTS

| | | | |
|---|---|---|---|
| 10,658,113 B2 * | 5/2020 | Jung | C04B 35/495 |
| 2011/0128665 A1 | 6/2011 | Nies | |
| 2015/0353430 A1 * | 12/2015 | Natsui | C01G 49/00 |
| | | | 252/62.9 PZ |
| 2016/0049248 A1 * | 2/2016 | Imura | H01G 4/1218 |
| | | | 501/139 |
| 2018/0155249 A1 * | 6/2018 | Terada | H01G 4/228 |
| 2022/0005647 A1 * | 1/2022 | Jo | H01G 7/06 |
| 2022/0028613 A1 * | 1/2022 | Jeong | H01L 28/60 |
| 2022/0246353 A1 * | 8/2022 | Park | H01G 4/1254 |

FOREIGN PATENT DOCUMENTS

| | | | | |
|---|---|---|---|---|
| CN | 109336588 A | | 2/2019 | |
| CN | 109456054 A | | 3/2019 | |
| CN | 110436920 A | * | 11/2019 | |
| CN | 110540423 A | | 12/2019 | |
| EP | 3191427 B1 | * | 11/2020 | ........... C04B 35/462 |
| JP | 4100636 B2 | | 6/2008 | |
| KR | 10-2020605 B1 | | 9/2019 | |
| PT | 104881 A | * | 6/2011 | |
| WO | WO-2017163843 A1 | * | 9/2017 | ............. C04B 35/01 |

OTHER PUBLICATIONS

He Qi et al., "Linear-like lead free relaxor antiferroelectric (Bi0.5Na0.5)TiO3-NaNbO3 with giant energy-storage; density/efficiency and super stability against temperature and frequency," J. Mater. Chem., pp. 3971~3978, Jan. 21, 2019.

* cited by examiner

DIELECTRIC MATERIAL, METHOD OF PREPARING THE SAME, AND DEVICE COMPRISING THE DIELECTRIC MATERIAL

CROSS-REFERENCE TO RELATED APPLICATION

This application is based on and claims priority under 35 U.S.C. § 119 to Korean Patent Application No. 10-2021-0013468, filed on Jan. 29, 2021, in the Korean Intellectual Property Office, the disclosure of which is incorporated by reference herein in its entirety.

BACKGROUND

1. Field

The present disclosure relates to dielectric materials, preparation methods thereof, and devices including the same.

2. Description of the Related Art

In accordance with the continuing demand for miniaturization and higher capacity of electronic products, capacitors having a smaller size and higher capacity compared to capacitors of the related art are required. In order to implement capacitors having a smaller size and higher capacity, there is a need for dielectric materials that can provide further improved dielectric properties.

To manufacture a multi-layered ceramic capacitor (MLCC), which is a type of small-size, high-capacity capacitor, dielectric layers need to be made thin. This inevitably induces a rapid increase in an electric field, which leads to a reduction in spontaneous polarization of dielectrics, and consequently, a remarkable drop in permittivity. In addition, the need for a high-temperature dielectric material for use in high value-added MLCC for vehicles or special purposes is gradually increasing. However, a dielectric material that simultaneously satisfies a high permittivity (400 or greater) and a high resistivity (>1.0e12 ohm*cm) is absent in the related art.

SUMMARY

Provided is a high-temperature dielectric material that has excellent temperature characteristics while simultaneously satisfying a high permittivity and a high resistivity.

Provided is a device including the dielectric material.

Provided is a method of preparing the dielectric material.

Additional aspects will be set forth in part in the description which follows and, in part, will be apparent from the description, or may be learned by practice of the presented embodiments of the disclosure. According to an aspect, provided is a dielectric material including a composite represented by Formula 1.

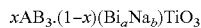   [Formula 1]

wherein, in Formula 1, A is at least one element selected from among lanthanum group elements, rare earth metal elements, or alkaline earth metal elements, B is at least one element selected from transition metal elements, $0.1 \leq x \leq 0.5$, $0<a<1$, $0<b<1$, and $a+b=1$.

According to another aspect, provided is a device comprising: a first electrode; second electrode facing the first electrode; and a dielectric layer arranged between the first electrode and the second electrode, wherein the dielectric layer includes the dielectric material described above.

The device may be a capacitor. In the case where the first electrode, the dielectric layer, and the second electrode are sequentially stacked, on the second electrode, the dielectric layer and the second electrode may be repeatedly and alternately stacked.

The capacitor may be a multi-layered capacitor including a plurality of internal electrodes; and dielectric layers alternately stacked between the plurality of internal electrodes.

According to another aspect, provided is a method of preparing a dielectric material including a composite represented by Formula 1, the method comprising: mechanically milling a mixture of an A compound, a B compound, a Bi compound, a Na compound, and a Ti compound; and first heat treatment under an oxidizing atmosphere:

   [Formula 1]

wherein, in Formula 1, A is at least one element selected from among lanthanum group elements, rare earth metal elements, and alkaline earth metal elements, B is at least one element selected from transition metal elements, $0.1 \leq x \leq 0.5$, $0<a<1$, $0<b<1$, and $a+b=1$.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
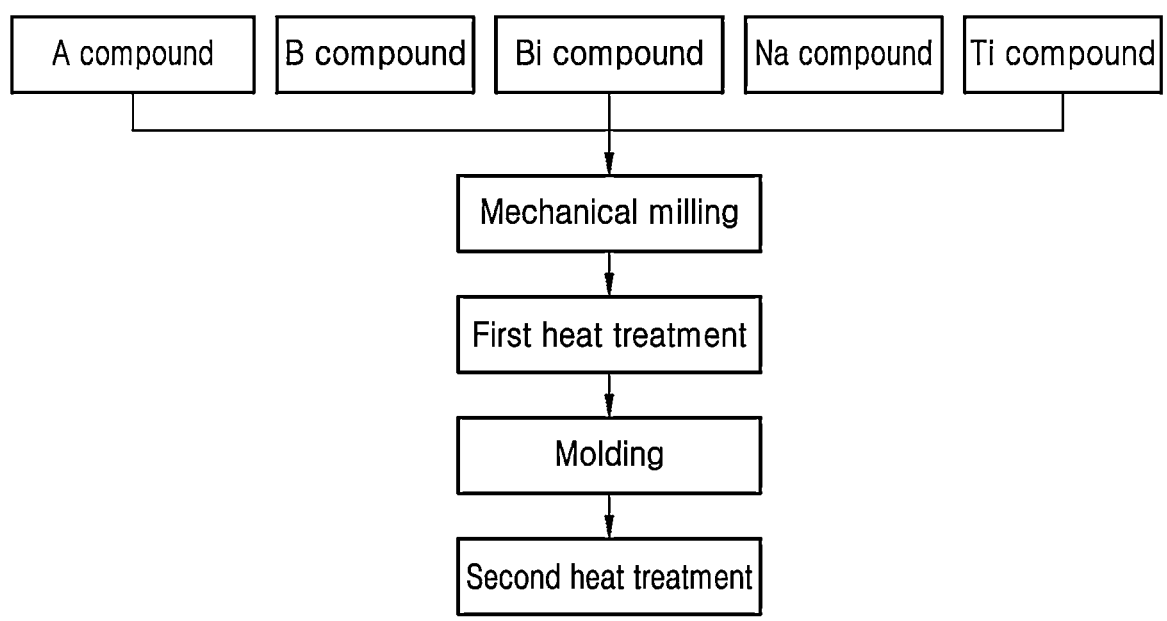
FIG. 1 is a schematic view for explaining a method of preparing a dielectric material according to some example embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Throughout the disclosure, the expression "at least one of a, b, or c" indicates only a, only b, only c, both a and b, both a and c, both b and c, all of a, b, and c, and/or variations thereof.

It will be understood that when an element is referred to as being "on" another element, the element can be directly on another element or intervening elements. In contrast, when an element is referred to as being "directly on" another element, there are no intervening elements present.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein are for the purpose of describing specific implementations only and are not intended to be limiting to the particular forms disclosed therein, and should be understood to include all modifications, equivalents, and substitutes in the scope of the inventive concepts. The singular forms used herein include plural forms, including "at least one," unless clearly specified otherwise. The expression "at least one" should not be construed as limiting a singular form. As used herein, the term "and/or" includes any and all combinations of one or more of the associated listed items. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms such as "below", "downward," "lower," "above," "upward," "upper," etc., may be used herein for ease of description to describe the relationship of one element or feature to another element(s) or feature(s). It will be understood that the spatially relative terms are intended to encompass different orientations of the device in use or operation, in addition to the orientation depicted in the figures. For example, if the device in the figures is turned over, elements described as "below" or "under" other elements or features would then be oriented "above" the other elements or features. Thus, the example terms "below" or "under" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined.

Example embodiments are described herein with reference to cross-sectional illustrations that are schematic illustrations of idealized embodiments. As such, variations from the shapes of the illustrations as a result, for example, of manufacturing techniques and/or tolerances, are to be expected. Thus, embodiments described herein should not be construed as limited to particular shapes of regions as illustrated herein but are to include, for example, deviations in shapes that result from manufacturing. For example, a region illustrated or described as flat may, typically, have rough and/or nonlinear features. Furthermore, an angle illustrated sharp may be round. Thus, the regions illustrated in the figures are schematic in nature and their shapes are not intended to illustrate the precise shape of a region and are not intended to limit the scope of the present claims.

The term "Group" used herein means a column of the periodic table of elements according to Group 1-18 classification system by the International Pure and Applied Chemical Federation ("IUPAC") Association.

Although specific implementations have been described, it will be apparent to a person skilled in the art that currently unexpected or potentially unexpectable alternatives, corrections, modifications, improvements, and substantial equivalents may be applied. Thus, the appended claims that can be filed and modified are intended to include all such alternatives, corrections, modifications, improvements, and substantial equivalents.

Hereinafter, embodiments of a dielectric material, a device including the same, and a method of preparing the dielectric material will be described in detail.

A dielectric material according to some example embodiments includes a composite represented by Formula 1.

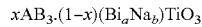

$$xAB_3 \cdot (1-x)(Bi_aNa_b)TiO_3 \quad \text{[Formula 1]}$$

wherein, in Formula 1, A is at least one element selected from among lanthanum group elements, rare earth metal elements, and/or alkaline earth metal elements, B is at least one element selected from transition metal elements, $0.1 \leq x \leq 0.5$, $0 < a < 1$, $0 < b < 1$, and $a+b=1$. For example, in some embodiments, A may be at least one element selected from the alkaline earth metal elements.

In some embodiments, A may be, for example, at least one of barium (Ba), strontium (Sr), calcium (Ca), and/or a combination thereof, and B may be at least one of nickel (Ni), palladium (Pd), lead (Pb), iron (Fe), iridium (Ir), cobalt (Co), rhodium (Rh), manganese (Mn), chromium (Cr), ruthenium (Ru), rhenium (Re), Tin (Sn), vanadium (V), Germanium (Ge), tungsten (W), zirconium (Zr), molybdenum (Mo), hafnium (Hf), uranium (U), niobium (Nb), thorium (Th), tantalum (Ta), bismuth (Bi), calcium (Ca), strontium (Sr), barium (Ba), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), magnesium (Mg), aluminum (Al), silicon (Si), scandium (Sc), zinc (Zn), gallium (Ga), rubidium (Rb), silver (Ag), cadmium (Cd), indium (In), antimony (Sb), platinum (Pt), gold (Au), lead (Pb), and/or a combination thereof.

In one or more embodiments, A may be Ba, and B may be Mg, Nb, Zr, Ta, Fe, or a combination thereof.

In Formula 1, x may be 0.1 to 0.5, for example, 0.3 to 0.5. Here, the meaning of x is 0.1 to 0.5 is that in the compound of Formula 1, the amount of $ABO_3$ is 10 mol % to 50 mol %. Similarly, in Formula 1, a and b may represent a molar ratio of bismuth (Bi) and sodium (Na).

A pure $(Bi_aNa_b)TiO_3$ (also referred to as BNT)-based dielectric material, for example, $Bi_{0.5}Na_{0.5}TiO_3$, is low in permittivity and resistivity, and has insufficient temperature characteristics for required specifications. For example, a permittivity change rate of the BNT-based dielectric material in a temperature range of −55 to 200° C. is greater than 15%.

However, the composite of Formula 1 may improve permittivity and temperature characteristics at the same time through addition and/or substitution in the pure BNT-based dielectric material of a perovskite, $ABO_3$ composition of a different oxidation state from $Bi^{+3}$ and $Na^{+1}$ to form relaxors. The composite of Formula 1 may be in the form of a solid solution. For example, the solid solution may include a base composition of BNT and a solid solute of $ABO_3$.

In the case where a BNT-dielectric material having a rhombohedral crystal structure is used as a matrix and to which a perovskite of a different oxidation state from Bi and Na and an $ABO_3$ composition are added and/or substituted, the lattice structure is modified due to differences in ionic radius with respect to each element of the BNT used as a matrix, and thus, a pseudo-rhombohedral structure may be formed. As a result, a phase transition temperature of the BNT as a matrix is changed to about −50° C. or less, and thus, a composite having a permittivity with a low permittivity change rate of −15% to +15% and excellent temperature characteristics may be obtained. Therefore, a dielectric material for high-temperature use, which includes the composite of Formula 1 and thus may be used for automobiles and/or special purposes, may be provided.

Furthermore, the dielectric material including the composition of Formula 1 may form a defect cluster by the introduction of A element and B element at the sites of constituent elements of BNT, due to the A element and B element having different oxidation states from those of the constituent elements of BNT, and substitution therewith. Thus, in the dielectric material, due to an AC sweep reaction energy barrier reduced even at a high electric field due to an effect of a polar nano-region (PNR), a polarization fixation phenomenon is alleviated, and thus, a permittivity reduction rate may be improved. Thus, the dielectric material may be used as a dielectric material even for high-voltage use (for example, 87 kV/cm or higher).

In one or more embodiments, the dielectric material including the composite of Formula 1 according to some example embodiment may be a relaxor-ferroelectric material.

Due to the polar nano-region (PNR) in the relaxor-ferroelectric material, the dielectric material may effectively responds to a high electric field, for example, a high-DC biased AC bias voltage, and thus exhibits high permittivity.

The relaxor-ferroelectric material, which is a dielectric material according to some example embodiments, may include a ferroelectric material, which exhibits a first polarization characteristic; and a polar region, which exhibits a second polarization characteristic. The first polarization characteristic and the second polarization characteristic may be different from each other. The first polarization characteristic and the second polarization characteristic may include spontaneous polarization characteristics. The ferroelectric material may have a thickness of 1000 nm or less.

Figure 6:
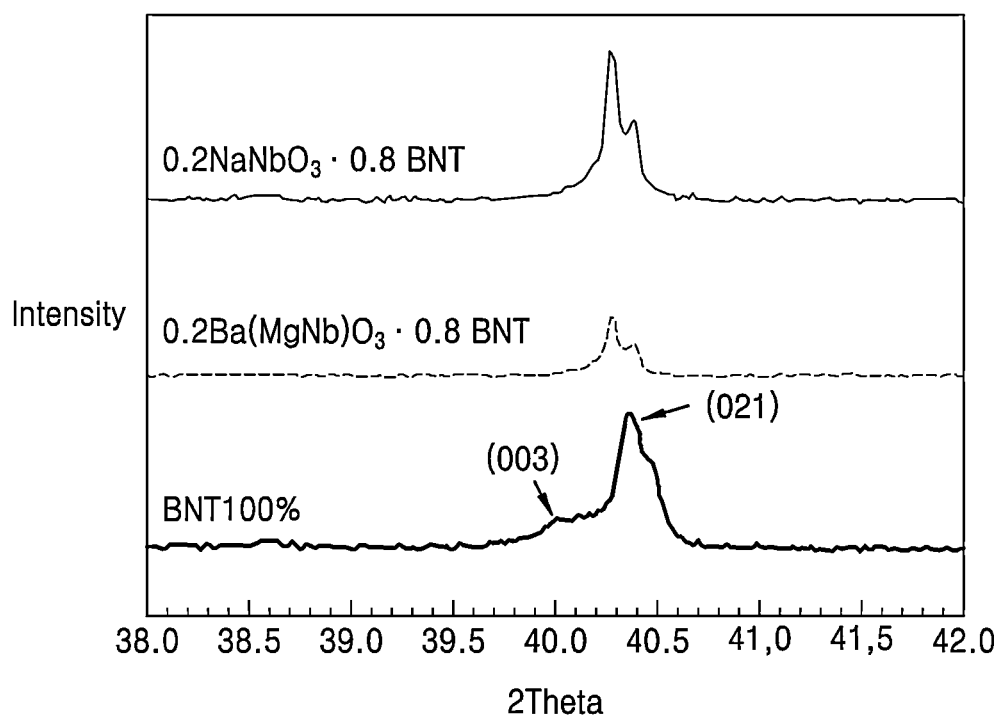
FIGS. 6 and 7 show X-ray diffraction patterns for explaining crystal structures of dielectric materials according to some example embodiments.
Figure 7:
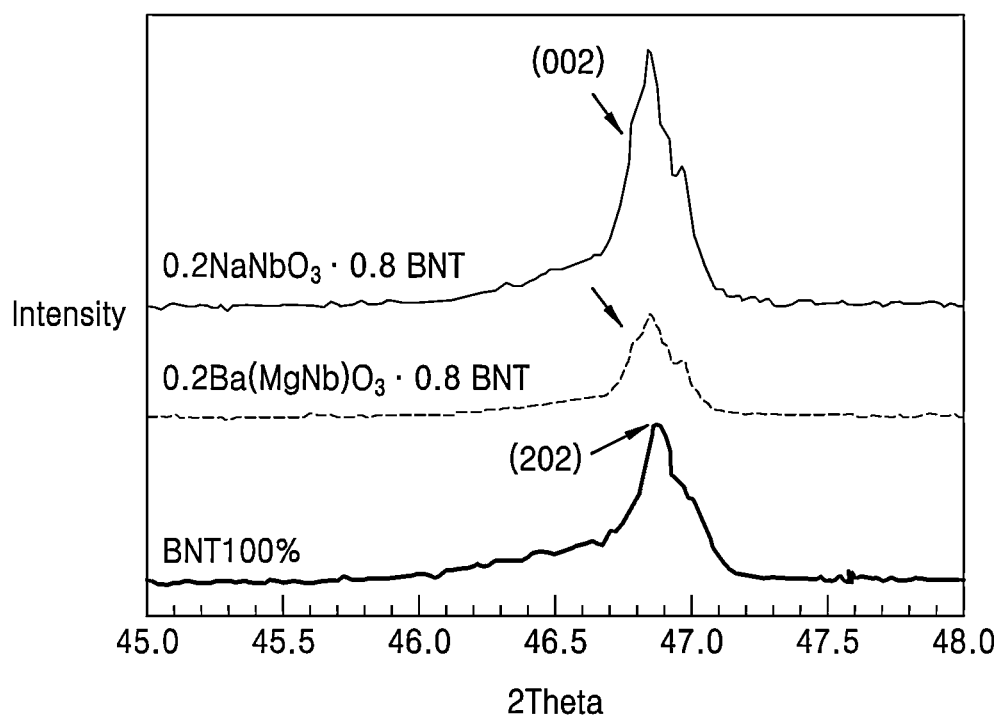

The ferroelectric material may be and/or include a dielectric material and/or dielectric layer, and the polar region may be a region that includes a solid solution including a different material from the ferroelectric material. When the ferroelectric material is a ferroelectric material including the dielectric material of Formula 1, the crystal structure of a relaxor-ferroelectric material including a polar region is a pseudo-rhombohedral structure as a whole, and ferroelectric material may further have a relaxation structure in which rhombohedral and tetragonal phases coexist. For example, as shown in FIGS. 6 and 7, pure BNT (rhombohedral) exhibits the (003) peak at 40°, while the (003) peak weakens when the rhombohedral phase coexists with the tetragonal phase. Likewise, the (002) peak of the tetragonal phase, which does not appear in the rhombohedral phase, appears weakly at 46°. That is, it can be seen that the ferroelectric material has a relaxation structure in which the rhombohedral and tetragonal phases coexist.

For example, the polar region may be expressed as a region in which main elements of the ferroelectric material are substituted with other elements. In the case where the ferroelectric material is BNT, the polar region is a region formed by a defect cluster in which Bi and Na at A-sites of BNT are substituted with a first element (e.g., A of Formula 1) different from Bi, and Ti at a B-site is substituted with a second element (e.g., B of Formula 2) different from Ti, and thus may be a polar nano region (PNR).

The first element and the second element may have different radii. In one or more embodiment, the ionic radius of the first element may be greater than the ionic radius of the second element. The amount of the first element may be the same as the amount of the second element in the relaxor-ferroelectric material.

In some embodiments, because the material of the polar region differs from the ferroelectric material, as described above, the polarization characteristic of the ferroelectric material (which may be referred to as a first polarization characteristic) may be different from the polarization characteristic of the polar region (which may be referred to as a second polarization characteristic). Accordingly, an energy barrier of the ferroelectric material and an energy barrier of the polar region, which respond to AC sweeping, may be different from each other. In one or more embodiments, the energy barrier of the polar region, which responds to AC sweeping, may be lower than the energy barrier of the ferroelectric material. For this reason, in the case where the relaxor-ferroelectric material is under a high DC bias, the total polarization of the ferroelectric material is fixed in the DC bias direction due to a high electric field by the DC bias, and there is no response to an AC bias applied to the relaxor-ferroelectric material, while the polar region may directly respond to an AC bias, and thus the polarization direction of the polar region may change in response to an AC bias. In this way, the relaxor-ferroelectric material may exhibit a high permittivity even under a high electric field caused by a high DC voltage.

In the relaxor-ferroelectric material, the ferroelectric material may include a plurality of domains, and each domain in the ferroelectric material may include a plurality of polar regions (e.g., PNR). The polarization characteristics of regions other than the plurality of polar regions in each domain may be different from that of the polar regions.

In one or more embodiments, the composite represented by Formula 1 may be, for example, a compound represented by Formula 2.

$$x Ba(Mg_y Nb_{1-y})O_3 \cdot (1-x)(Bi_a Na_b)TiO_3 \qquad \text{[Formula 2]}$$

In Formula 2, 0.3≤x≤0.5, 0<y<1, 0<a<1, 0<b<1, and a+b=1.

For example, the composite represented by Formula 1 may be, for example, a compound represented by Formula 3.

$$x Ba(Mg_{1/3} Nb_{2/3})O_3 \cdot (1-x)(Bi_{0.5} Na_{0.5})TiO_3 \qquad \text{[Formula 3]}$$

In Formula 3, 0.3≤x≤0.5.

In one or more embodiments, the composite represented by Formula 1 may be, for example, a compound represented by Formula 4.

$$x CaSnO_3 \cdot (1-x)(Bi_a Na_b)TiO_3 \qquad \text{[Formula 4]}$$

In Formula 4, 0.1≤x≤0.5, 0≤a≤1, 0≤b≤1, and a+b=1.

The composite of Formula 1 may be, for example, $xBa(Mg_c Nb_d)O_3 \cdot (1-x)(Bi_a Na_b)TiO_3$, $xBa(Ga_c Sb_d)O_3 \cdot (1-x)(Bi_a Na_b)TiO_3$, $xBa(Sc_c Sb_d)O_3 \cdot (1-x)(Bi_a Na_b)TiO_3$, $xBa(La_c Sb_d)O_3 \cdot (1-x)(Bi_a Na_b)TiO_3$, $xBa(B_c Sb_d)O_3 \cdot (1-x)$ $(Bi_aNa_b)TiO_3$, $xBa(Al_cSb_d)O_3 \cdot (1-x)(Bi_aNa_b)TiO_3$, $xBa(La_cSb_d)O_3 \cdot (1-x)(Bi_aNa_b)TiO_3$, $xBa(In_cSb_d)O_3 \cdot (1-x)(Bi_aNa_b)TiO_3$, $xBa(Y_cSb_d)O_3 \cdot (1-x)(Bi_aNa_b)TiO_3$, $xBa(Ce_cSb_d)O_3 \cdot (1-x)(Bi_aNa_b)TiO_3$, $xBa(Nd_cSb_d)O_3 \cdot (1-x)(Bi_aNa_b)TiO_3$, $xBa(Gd_cSb_d)O_3 \cdot (1-x)(Bi_aNa_b)TiO_3$, $xBa(Sm_cSb_d)O_3 \cdot (1-x)(Bi_aNa_b)TiO_3$, $xBa(Eu_cSb_d)O_3 \cdot (1-x)(Bi_aNa_b)TiO_3$, $xBa(Tb_cSb_d)O_3 \cdot (1-x)(Bi_aNa_b)TiO_3$, $xSr(Mg_cNb_d)O_3 \cdot (1-x)(Bi_aNa_b)TiO_3$, $xSr(Ga_cSb_d)O_3 \cdot (1-x)(Bi_aNa_b)TiO_3$, $xSr(Sc_cSb_d)O_3 \cdot (1-x)(Bi_aNa_b)TiO_3$, $xSr(La_cSb_d)O_3 \cdot (1-x)(Bi_aNa_b)TiO_3$, $xSr(B_cSb_d)O_3 \cdot (1-x)(Bi_aNa_b)TiO_3$, $xSr(Al_cSb_d)O_3 \cdot (1-x)(Bi_aNa_b)TiO_3$, $xSr(La_cSb_d)O_3 \cdot (1-x)(Bi_aNa_b)TiO_3$, $xSr(In_cSb_d)O_3 \cdot (1-x)(Bi_aNa_b)TiO_3$, $xSr(Y_cSb_d)O_3 \cdot (1-x)(Bi_aNa_b)TiO_3$, $xSr(Ce_cSb_d)O_3 \cdot (1-x)(Bi_aNa_b)TiO_3$, $xSr(Nd_cSb_d)O_3 \cdot (1-x)(Bi_aNa_b)TiO_3$, $xSr(Gd_cSb_d)O_3 \cdot (1-x)(Bi_aNa_b)TiO_3$, $xSr(Sm_cSb_d)O_3 \cdot (1-x)(Bi_aNa_b)TiO_3$, $xSr(Eu_cSb_d)O_3 \cdot (1-x)(Bi_aNa_b)TiO_3$, $xSr(Tb_cSb_d)O_3 \cdot (1-x)(Bi_aNa_b)TiO_3$, $xCa(Mg_cNb_d)O_3 \cdot (1-x)(Bi_aNa_b)TiO_3$, $xCa(Ga_cSb_d)O_3 \cdot (1-x)(Bi_aNa_b)TiO_3$, $xCa(Sc_cSb_d)O_3 \cdot (1-x)(Bi_aNa_b)TiO_3$, $xCa(La_cSb_d)O_3 \cdot (1-x)(Bi_aNa_b)TiO_3$, $xCa(B_cSb_d)O_3 \cdot (1-x)(Bi_aNa_b)TiO_3$, $xCa(Al_cSb_d)O_3 \cdot (1-x)(Bi_aNa_b)TiO_3$, $xCa(La_cSb_d)O_3 \cdot (1-x)(Bi_aNa_b)TiO_3$, $xCa(In_cSb_d)O_3 \cdot (1-x)(Bi_aNa_b)TiO_3$, $xCa(Y_cSb_d)O_3 \cdot (1-x)(Bi_aNa_b)TiO_3$, $xCa(Ce_cSb_d)O_3 \cdot (1-x)(Bi_aNa_b)TiO_3$, $xCa(Nd_cSb_d)O_3 \cdot (1-x)(Bi_aNa_b)TiO_3$, $xCa(Gd_cSb_d)O_3 \cdot (1-x)(Bi_aNa_b)TiO_3$, $xCa(Sm_cSb_d)O_3 \cdot (1-x)(Bi_aNa_b)TiO_3$, $xCa(Eu_cSb_d)O_3 \cdot (1-x)(Bi_aNa_b)TiO_3$, and/or $xCa(Tb_cSb_d)O_3 \cdot (1-x)(Bi_aNa_b)TiO_3$, wherein, in these formulae, x is 0.1 to 0.5, $0<a<1$, $0<b<1$, $a+b=1$, $0<c<1$, $0<d<1$, and $c+d=1$. In one or more embodiments, in the formulae, $a=0.5$, $b=0.5$, $0<c<1$, $0<d<1$, and $c+d=1$.

The dielectric material including the composite represented by Formula 1 may have a composite-phase crystal structure including one or more selected from a rhombohedral phase, an orthorhombic phase, a cubic phase, and/or a tetragonal phase. For example, the dielectric material may have a pseudo-rhombohedral phase under a condition of 10 mol % or more of solid solution content. Here the pseudo-rhombohedral phase refers to a rhombohedral phase-like crystal structure. The structural characteristics of the composite phase as aggregates appear as a pseudo-rhombohedral phase.

The dielectric material according to an embodiment may have a permittivity of 400 or greater at room temperature (25° C.) at 1 kHz to 1 MHz, and thus, a capacitor including this dielectric material may have improved dielectric characteristics, and furthermore, may be easily formed to be smaller and thinner and have higher capacity. The dielectric material may have a permittivity of 400 or greater, 500 or greater, 600 or greater, 700 or greater, 800 or greater, 900 or greater, or 1000 or greater, for example, a permittivity of 400 to 10,000.

In one or more embodiments, the dielectric material may have a resistivity of 1.0E12 Ωcm or greater.

In one or more embodiments, the dielectric material may exhibit a change in capacitance of −15% to 15% in a temperature range of −55° C. to 200° C.

A device according to another embodiment includes a first electrode; a second electrode facing the first electrode; and a dielectric layer arranged between the first electrode and the second electrode, wherein the dielectric layer includes the dielectric material according to one or more embodiments.

The device may be, for example, a capacitor.

In the case where the first electrode, the dielectric layer, and the second electrode are sequentially stacked in the device, the dielectric layer and the second electrode may be repeatedly and alternately stacked on the second electrode.

For example, the capacitor may include a plurality of internal electrodes; and a dielectric structure arranged between the internal electrodes to alternate therewith. For example, the dielectric structure may include one or more dielectric layers arranged between the internal electrodes and may including the dielectric material according to one or more embodiments.

The dielectric layer may have a resistivity of 1.0E+12 Ωcm or greater, for example, 5.0E+12 Ωcm or greater, for example, 1.0E+13 Ωcm or greater, and/or for example, 1.0E+12 to 5.0E+13 Ωcm. As above, the dielectric layer has excellent insulating characteristics.

By including the dielectric material according to the above-described embodiments, the device according to one or embodiments may have improved dielectric characteristics, and accordingly, have improved electrical characteristics.

The device may be used in an electric circuit, an electronic circuit, an electromagnetic circuit, and/or the like, and is not particularly limited as long as the device provides an electrical output for an electrical input. The electrical input may be current and/or voltage, and the current may be direct current or alternating current. The electrical input may be continuous input or intermittent input with a constant cycle. The device may store electrical energy, electrical signals, magnetic energy, and/or magnetic signals. The device may be a semiconductor, a memory, a processor, or the like. The device may be, for example, a resistor, an inductor, a capacitor, or the like.

The device may be, for example, a capacitor. The capacitor may be, for example, a multi-layer capacitor including a plurality of internal electrodes; and the above-described dielectric layer alternately disposed between the plurality of internal electrodes. The capacitor may be an independent device, such as a multi-layer capacitor, but is not necessarily limited thereto, and may be included as part of a memory. The capacitor may be, for example, a metal insulator metal (MIM) capacitor mounted in a memory device.

Figure 5:
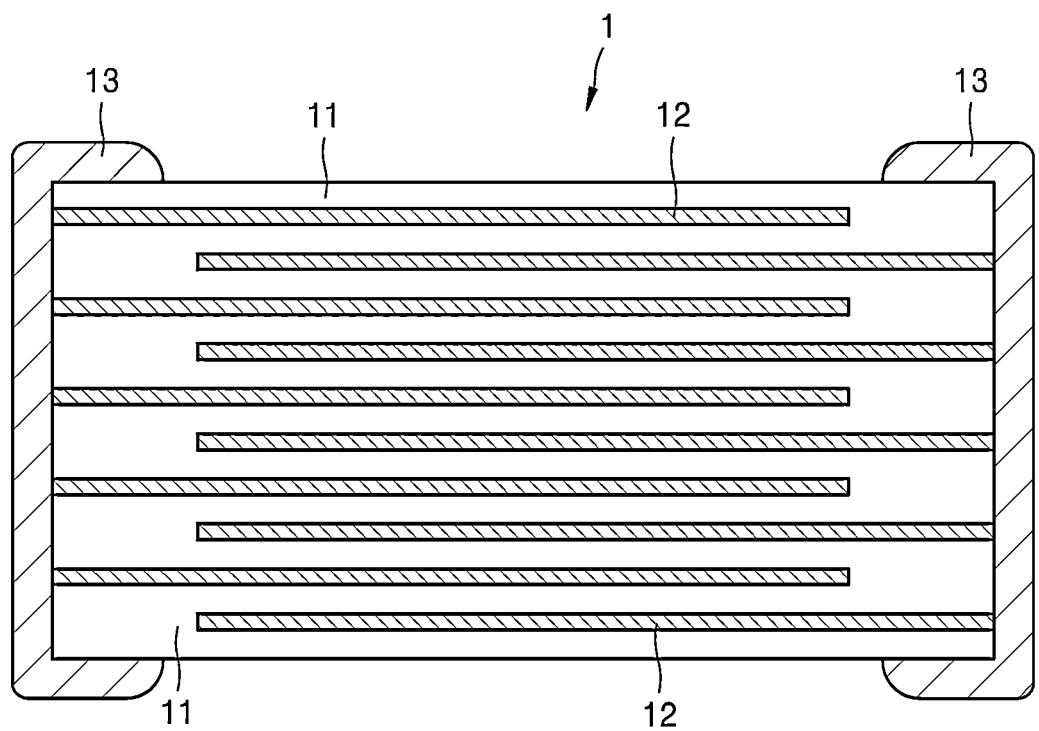
FIG. 5 is a schematic view of a multi-layered ceramic capacitor (MLCC) according to some example embodiments.

Referring to FIG. 5, a multi-layer capacitor 1 according to an embodiment may include a plurality of internal electrodes 12; and a dielectric layer 11 alternately disposed between the plurality of internal electrodes 12. The multi-layer capacitor 1 may have a structure in which the plurality of internal electrodes 12 and the dielectric layer 11 are alternately stacked, and the dielectric layer 11 may include the dielectric material according to one or more embodiments. The adjacent internal electrodes 12 may be electrically separated from one another by the dielectric layer 11 disposed therebetween. In the multi-layer capacitor 1, as the internal electrodes 12 and the dielectric layer 11 are alternately stacked, the dielectric layer 11 disposed between the adjacent internal electrodes 12 may act as a single unit capacitor. In the multi-layer capacitor 1, the number of internal electrodes 12 and the number of dielectric layers 11, which are alternately stacked, may each independently be, for example, 2 or greater, 5 or greater, 10 or greater, 20 or greater, 50 or greater, 100 or greater, 200 or greater, 500 or greater, 1,000 or greater, 2,000 or greater, 5,000 or greater, and/or 10,000 or greater. The multi-layer capacitor 1 may provide capacitance through the stacked structure in which a plurality of unit capacitors are stacked. As the number of stacked internal electrodes 12 and dielectric layers 11 increases, a contact area thereof may increase, thus increasing the capacitance. The area and/or volume of the internal electrodes 12 may be less than the area and/or volume of the dielectric layer 11. The plurality of the internal electrodes 12 may each have an identical area and/or volume. However, the adjacent internal electrodes 12 may be disposed not to be in the same position along the thickness direction of the multi-layer capacitor 1, and to partially protrude alternately in the directions of the opposing side surfaces of the multi-layer capacitor 1. The internal electrodes 12 may be formed, for example, using a conductive paste including at least one selected from nickel (Ni), copper (Cu), palladium (Pd), and/or a palladium-silver (Pd—Ag) alloy. A printing method of the conductive paste may be a screen printing method or a gravure printing method, but is not necessarily limited thereto, and any method of forming internal electrodes, the method being used in the art, may be used. The internal electrodes 12 may have a thickness of, for example, 100 nm to 5 μm, 100 nm to 2.5 μm, 100 nm to 1 μm, 100 nm to 800 nm, 100 nm to 400 nm, or 100 nm to 200 nm.

Referring to FIG. 5, a plurality of the internal electrodes 12, which are alternately stacked to partially protrude in directions of opposing side surfaces of the laminated capacitor 1, may be electrically connected to external electrodes 13. The external electrodes 13 may be disposed, for example, on a laminate including the plurality of internal electrodes 12 and the dielectric layer 11 alternately disposed between the plurality of the internal electrodes 12, and connected to the internal electrodes 12. The multi-layer capacitor 1 may include the internal electrodes 12, and external electrodes 13 respectively connected to the internal electrodes 12. The multi-layer capacitor 1 may include, for example, a pair of external electrodes 13 surrounding the opposite sides of a laminate structure including the internal electrodes 12 and the dielectric layer 11. The external electrodes 13 may be a material having electrical conductivity, such as metal, or may be a specific material, which may be determined considering electrical characteristics, structural stability, and/or the like. The external electrodes 13 may have, for example, a multi-layer structure. The external electrodes 13 may include, for example, an electrode layer contacting the laminate and the internal electrodes 12 and including Ni, and a plating layer on the electrode layer.

Referring to FIG. 5, the area and/or volume of the dielectric layers 11 in the multi-layer capacitor 1 may be, for example, greater than the area and/or volume of the adjacent internal electrodes 12. The dielectric layer 11 disposed between the adjacent internal electrodes 12 in the multi-layer capacitor 1 may be connected to each other. The dielectric layer 11 disposed between the adjacent internal electrodes 12 may be connected to one another on the sides in contact with the external electrodes 13 in the multi-layer capacitor 1. For example, the external electrodes 13 may be omitted. In the case of the external electrodes 13 being omitted, the internal electrodes 12 protruding to the opposing sides of the multi-layer capacitor 1 may be connected to a power source.

In a unit capacitor including the adjacent internal electrodes 12 and the dielectric layers 11 disposed therebetween, a thickness of the dielectric layer 11 (e.g., a gap between the adjacent internal electrodes 12) may be, for example, 10 nm to 1 μm, 100 nm to 800 nm, 100 nm to 600 nm, or 100 nm to 300 nm. In a unit capacitor including the adjacent internal electrodes 12 and the dielectric layers 11 disposed therebetween, the dielectric layer 11 may have a permittivity of, for example, 600 or greater at room temperature (25° C.) in a range of 1 kHz to 1 Mhz, a resistivity of 1.0E12 Ωcm or greater, and a change in capacitance in a range of −15% to 15% in a temperature range of 55° C. to 200° C.

By the inclusion of the dielectric layer 11 having such a small thickness and high permittivity, the multi-layer capacitor 1 may have increased capacitance and have reduced thickness and volume. Accordingly, a smaller, thinner capacitor with higher capacity may be provided.

Hereinafter, a method of preparing the dielectric material according to one or more embodiments will be described.

FIG. 1 is a schematic view for explaining a method of preparing a dielectric material according to an embodiment.

Referring to FIG. 1, a method of preparing a dielectric material according to an embodiment includes:

mechanically milling a mixture of an A compound, a B compound, a bismuth (Bi) compound, a sodium (Na) compound, and a Ti compound; and performing a first heat treatment under an oxidizing atmosphere.

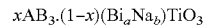

$$xAB_3 \cdot (1-x)(Bi_aNa_b)TiO_3 \quad \text{[Formula 1]}$$

In Formula 1, A is at least one element selected from among lanthanum group elements, rare earth metal elements, and alkaline earth metal elements, B is at least one element selected from transition metal elements, $0.1 \leq x \leq 0.5$, $0 < a < 1$, $0 < b < 1$, and $a+b=1$.

The A compound may be, for example, a salt, a carbonate, a sulfate, a nitrate, a halide, and/or an acetate, each containing A element, or a combination thereof.

The B compound may be, for example, a salt, a carbonate, a sulfate, a nitrate, a halide, an acetate, and/or an oxide, each containing B element, a hydrate thereof, or a combination thereof.

The Bi compound may be, for example, a carbonate, a sulfate, a nitrate, a halide, an acetate, and/or an oxide, each containing Bi element, a hydrate thereof, or a combination thereof.

The Na compound may be, for example, a sodium salt, sodium carbonate, sodium sulfate, sodium nitrate, and/or a combination thereof. The Ti compound may be, for example, titanium oxide.

The amounts of the above-described A compound salt, B compound, Bi compound, Na compound, and the Ti compound may be stoichiometrically controlled to obtain the composite of Formula 1.

In the preparation method, the mechanical milling may be performed by using a ball-mill, an airjet-mill, a bead mill, a roll-mill, a planetary mill, a hand mill, a high energy ball mill, a planetary ball mill, a stirred ball mill, a vibrating mill, a mechanofusion mill, a shaker mill, a planetary mill, an attritor mill, a disk mill, a shape mill, a nauta mill, a nobilta mill, a high-speed mixer, and/or any combination thereof. The mechanical milling may be, for example, wet milling using a solvent. When the mechanical milling is performed by wet milling as described above, a dielectric material with improved permittivity characteristics may be prepared.

In the wet milling using a solvent, ethanol and/or the like may be used as the solvent. Although the mechanical milling time varies according to milling conditions, the mechanical milling time may be, for example, 1 to 30 hours, for example, 5 to 25 hours.

The first heat treatment may be performed at a temperature of 600 to 1000° C., for example, 700° C. to 950° C., for example, 800° C. to 900° C. The first heat treatment under an oxidizing atmosphere may be performed, for example, 1 to 30 hours, or 2 to 15 hours. By the heat treatment under an oxidizing atmosphere in such time periods, the dielectric material may have further improved dielectric characteristics.

The preparation method may further include, after the first heat treatment is performed as described above, obtaining a mold product using a product from the first heat treatment; and performing a second heat treatment of the molded product under an oxidizing atmosphere. For example, in some embodiments, obtaining the mold product may include pressing the product from the first heat treatment into a mold.

The second heat treatment may be performed at 1000° C. to 1600° C., for example, 1100° C. to 1500° C., for example, 1200° C. to 1400° C. The second heat treatment may be performed under an oxidizing atmosphere, and, for example, between 1 to 30 hours, and/or 2 to 25 hours. By the further inclusion of the second heat treatment under such conditions, defects of the dielectric material may be effectively prevented.

The first heat treatment and/or second heat treatment under an oxidizing atmosphere may be carried out under an atmosphere including oxygen, carbon dioxide, air, and/or the like. In an atmosphere containing oxygen, carbon dioxide, air, and/or the like, the amount of oxygen, carbon dioxide, air, and/or the like may be, for example, 0.1 to 10% by volume, 0.1 to 5% by volume, 0.1 to 3% by volume, and/or 0.5 to 2% by volume of the total gas volume. The remainder gas, excluding oxygen, carbon dioxide, air, and/or the like, may be an inert gas. The inert gas may be argon, nitrogen, or the like, but is not limited thereto, and may be any inert gas used in the art. For example, a gas including one or more of oxygen, carbon dioxide, air, and/or the like may be mixed with an inert gas.

As used herein, the term "oxidizing atmosphere" may be, for example, an air atmosphere.

The dielectric material according to one or more embodiments prepared according to the processes describe above is a high-dielectric material which may be used in multi-layered ceramic capacitors (MLCCs) in the trend of miniaturization and high performance, through pseudo-tetrahedral and polar nano-region (PNR) formation. In addition, the dielectric material may be dense with a relative density of 98% or greater.

The dielectric material according to one or more embodiments may be applicable as a multilayer dielectric for a piezoelectric actuator, a multilayer dielectric for an antenna, and a dielectric of a nonvolatile memory device. The dielectric material may be implemented as an MLCC of mobile phones/televisions, and vehicles.

One or more embodiments of the present disclosure will now be described in detail with reference to the following examples and comparative examples.

Preparation of Dielectric Material

Example 1

$BaCO_3$, MgO, $Nb_2O_5$, $Bi_2O_3$, $Na_2CO_3$, and $TiO_2$ were mixed to obtain a mixture, and ethanol and zirconia balls were added thereto. The mixture was then ball-milled at room temperature in an air atmosphere for 24 hours to prepare a mixture. The prepared mixture was dried at 100° C. for 1 day to obtain a dried powder. The amounts of $BaCO_3$, MgO, $Nb_2O_5$, $Bi_2O_3$, $Na_2CO_3$, and $TiO_2$ were stoichiometrically controlled in order to prepare a dielectric material as represented in Table 1.

The dried powder was put into an alumina crucible, and then subjected to a first heat treatment at 850° C. in an air atmosphere for 5 hours.

The first heat treatment product was pressed with uniaxial pressure to prepare pellets. The prepared pellets were heat-treated at 1300° C. in an atmosphere for 2 hours to prepare a dielectric material having a composition as represented in Table 1.

Examples 2 to 5

Dielectric materials were prepared in the same manner as in Example 1, except that the amounts of $BaCO_3$, MgO, $Nb_2O_5$, $Bi_2O_3$, $Na_2CO_3$, and $TiO_2$ were stoichiometrically controlled so as to prepare Examples 2 to 5 in Table 1.

Example 6

A dielectric material having the composition of $0.2CaSnO_3$-$0.8$ BNT was prepared in the same manner as in Example 1, except that the amounts of $CaCO_3$, $SnO_2$, $Bi_2O_3$, $Na_2CO_3$, and $TiO_2$ were stoichiometrically controlled so as to prepare a desired dielectric material. Here, BNT means $Bi_{0.5}Na_{0.5}TiO_3$.

Example 7

A dielectric material having the composition of $0.2SrSnO_3$-$0.8$ BNT was prepared in the same manner as in Example 1, except that the amounts of $SrCO_3$, $SnO_2$, $Bi_2O_3$, $Na_2CO_3$, and $TiO_2$ were stoichiometrically controlled so as to prepare a desired dielectric material.

Example 8

A dielectric material having the composition of $0.2BaSnO_3$-$0.8BNT$ was prepared in the same manner as in Example 1, except that the amounts of $BaCO_3$, $SnO_2$, $Bi_2O_3$, $Na_2CO_3$, and $TiO_2$ were stoichiometrically controlled so as to prepare a desired dielectric material.

Comparative Example 1

A dielectric material having the composition of $Bi_{0.5}Na_{0.5}TiO_3$ (BNT) was prepared in the same manner as in Example 1, except that $BaCO_3$, MgO, and $Nb_2O_5$ were not added in preparing the mixture.

Comparative Examples 2 and 3

Dielectric materials were prepared in the same manner as in Example 1, except that the amounts of $BaCO_3$, MgO, $Nb_2O_5$, $Bi_2O_3$, $Na_2CO_3$, and $TiO_2$ were stoichiometrically controlled so as to prepare Comparative Examples 2 and 3 as in Table 1.

Comparative Example 4

A dielectric material having the composition of $0.2NaNbO_3$-$0.8$ BNT was prepared in the same manner as in Example 1, except that the amounts of $Na_2CO_3$, $Nb_2O_5$, $Bi_2O_3$, $Na_2CO_3$, and $TiO_2$ were stoichiometrically controlled so as to prepare Comparative Example 4 as in Table 4.

Comparative Example 5

A dielectric material having the composition of $0.3NaNbO_3$-$0.7$ BNT was prepared in the same manner as in Example 1, except that the amounts of $Na_2CO_3$, $Nb_2O_5$, $Bi_2O_3$, $Na_2CO_3$, and $TiO_2$ were stoichiometrically controlled so as to prepare Comparative Example 5 as in Table 3.

Comparative Example 6

A dielectric material having the composition of $(Ba,Ca)Ti_2O_5$ was used for this comparative example.

TABLE 1

| Example | Composition of dielectric material |
|---|---|
| Comparative Example 1 | $Bi_{0.5}Na_{0.5}TiO_3$ |

TABLE 1-continued

| Example | Composition of dielectric material |
|---|---|
| Example 1 | $0.1Ba(Mg_{1/3}Nb_{2/3})O_3 \cdot 0.9Bi_{0.5}Na_{0.5}TiO_3$ |
| Example 2 | $0.2Ba(Mg_{1/3}Nb_{2/3})O_3 \cdot 0.8Bi_{0.5}Na_{0.5}TiO_3$ |
| Example 3 | $0.3Ba(Mg_{1/3}Nb_{2/3})O_3 \cdot 0.7Bi_{0.5}Na_{0.5}TiO_3$ |
| Example 4 | $0.4Ba(Mg_{1/3}Nb_{2/3})O_3 \cdot 0.6Bi_{0.5}Na_{0.5}TiO_3$ |
| Example 5 | $0.5Ba(Mg_{1/3}Nb_{2/3})O_3 \cdot 0.5Bi_{0.5}Na_{0.5}TiO_3$ |
| Comparative Example 2 | $0.6Ba(Mg_{1/3}Nb_{2/3})O_3 \cdot 0.4Bi_{0.5}Na_{0.5}TiO_3$ |
| Comparative Example 3 | $0.8Ba(Mg_{1/3}Nb_{2/3})O_3 \cdot 0.2Bi_{0.5}Na_{0.5}TiO_3$ |

Evaluation Example 1: Measurement of Dielectric Characteristics and Resistivity To identify dielectric characteristics and resistivities of the dielectric materials with respect to composition ratios, the dielectric characteristics and specific resistivities of the dielectric materials of Examples 1 to 5 and Comparative Examples 1 to 3 were evaluated according to the following methods.

Nominal Permittivity

Silver (Ag) was coated on opposite surfaces of the dielectric pellets to form electrodes, and then permittivity was measured at room temperature (25° C.) using an E4980A Precision LCR Meter (Keysight) at an AC voltage of 1 V and a frequency of 1 kHz or 100 Hz.

In Table 2, $\epsilon_r$ denotes permittivity, and tan δ denotes loss factor.

Resistivity

Using a Premier II Ferroelectric Tester (Radiant Technologies, Inc.), resistivity was measured for 1 second after stabilization for 60 seconds under the condition of applying a DC high-electric field of 8.7 V/μm.

The results of the evaluation of nominal permittivity and resistivity are shown in Table 2. In Table 2, BMNO is abbreviation for $Ba(Mg_{1/3}Nb_{2/3})O_3$, and BNT is abbreviation for $Bi_{0.5}Na_{0.5}TiO_3$.

TABLE 2

| | | Nominal permittivity (@1 kHz) | | Resistivity (ρ) | High-temperature characteristics $\Delta C/C_{RT}$ |
|---|---|---|---|---|---|
| | Composition | $\epsilon_r$ | tanδ | (Ωcm) | (@−55~200 °C) |
| Comparative Example 1 | BNT | 474 | 4.1% | 3.7E11 | −35%~62% |
| Example 1 | 0.1BMNO•0.9BNT | 1,554 | 0.6% | 5.1E12 | −55%~23% |
| Example 2 | 0.2BMNO•0.8BNT | 1,635 | 4.3% | 8.4E12 | −49%~−0.3% |
| Example 3 | 0.3BMNO•0.7BNT | 1,099 | 0.9% | 1.2E13 | −14%~−5% |
| Example 4 | 0.4BMNO•0.6BNT | 651 | 0.4% | 2.0E13 | −6.2%~−8.0% |
| Example 5 | 0.5BMNO•0.5BNT | 409 | 0.7% | 6.6E12 | 0.5%~−7% |
| Comparative Example 2 | 0.6BMNO•0.4BNT | 259 | 0.4% | 1.3E13 | 1.5%~−4.6% |
| Comparative Example 3 | 0.8BMNO•0.2BNT | 123 | 0.7% | 1.2E13 | 0.2%~3.3% |

As shown in Table 2, the dielectric materials of Examples 1 to 5 had a nominal permittivity of 400 or greater, and exhibited high dielectric characteristics with a resistivity greater than 1.0E12 ohm*cm.

Evaluation Example 2: Evaluation of High-Temperature Characteristics of Dielectric Material To identify high-temperature characteristics of the dielectric materials with respect to composition ratios, evaluation was performed as follows.

Silver (Ag) electrodes were coated on opposite surfaces of the pellets of the dielectric materials prepared in Examples 1 to 5 and Comparative Examples 1 to 3 to prepare specimens. A permittivity of each specimen with the electrodes on the opposite surfaces was measured using an LCR meter (Agilent, E4980A) at 25° C. and a condition of 1 kHz/1.0 V. The permittivity was measured in a temperature-controlled chamber at temperatures from −55° C. to 200° C. at 5° C. intervals with reference to X9S of the EIA specification, and some of the results are shown in FIG. 2.

Figure 2:
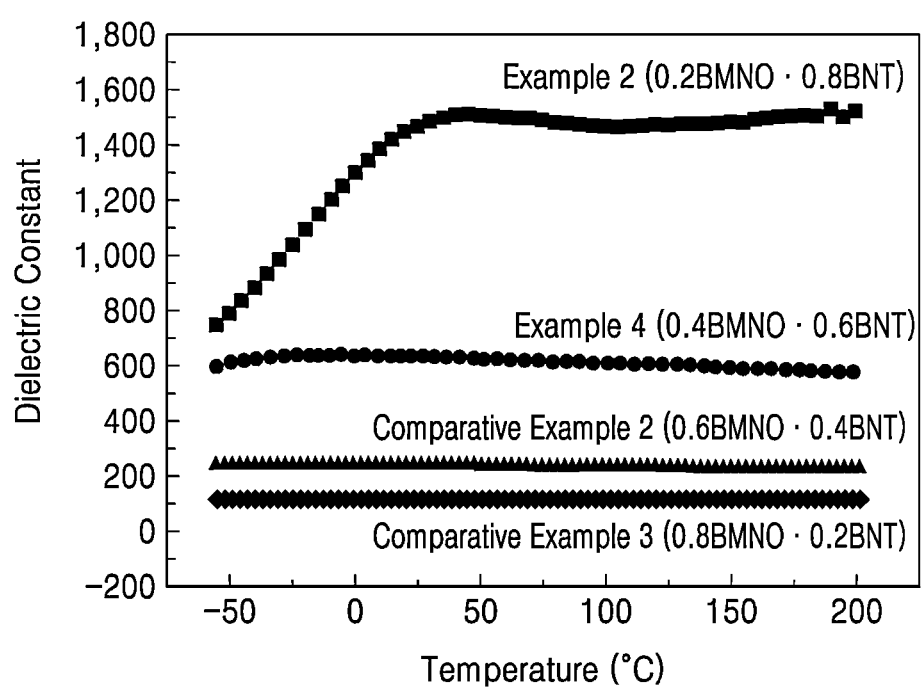
FIG. 2 shows changes in dielectric constant with respect to temperature in dielectric materials of Examples 2 and 4 and Comparative Examples 2 and 3.

As shown in FIG. 2, it was found that the dielectric materials of Examples 2 and 4 exhibited a high permittivity even at high temperature, as compared with those of the dielectric materials of Comparative Examples 1 and 2.

100% BNT has a great change in capacitance of −35% to 164% according to temperature, and thus, is not suitable as a dielectric material for use at high temperature. However, when Ba(MgNb)O3 is added thereto, advantageously, the capacitance variation according to temperature is reduced and resistivity is increased. However, since permittivity is reduced, for use at high temperature, it is considered that an appropriate amount of Ba(MgNb)O3 is 30-50 mol %.

To determine the temperature characteristics of permittivity (e.g., the temperature coefficient of capacitance (TCC)), capacitance was measured at temperatures from −55° C. to 200° C. at 5° C. intervals in a temperature-controlled chamber with reference to X9S of the EIA specification, and some of the results are shown in Table 2.

Evaluation Example 4: Evaluation of Dielectric Characteristic, Resistivity, and High-Temperature Characteristic According to Composition To identify dielectric characteristics, specific resistivities, and high-temperature characteristics of the dielectric materials according to composition, dielectric characteristics and specific resistivities of the dielectric materials prepared in Examples 3, 6, 7, and 8 and Comparative Examples 1, 5, and 6 were evaluated as in Evaluation Example 1, and the temperature characteristics of permittivity thereof were evaluated as in Evaluation Example 2. The results are shown in Table 3.

TABLE 3

| | | Nominal permittivity (@1 kHz) | | Resistivity (ρ) | High-temperature characteristics ΔC/C$_{RT}$ |
|---|---|---|---|---|---|
| | Composition | $\in_r$ | tanδ | (Ωcm) | (@−55~200 °C) |
| Example 3 | 0.3BMNO•0.7BNT | 1,099 | 0.9% | 1.2E13 | −14%~−5% |
| Example 6 | 0.2CaSnO$_3$•0.6BNT | 570 | 1.4% | 9.7E12 | 1%~−10% |
| Example 7 | 0.2SrSnO$_3$•0.8BNT | 711 | 3.1% | 3.7E12 | −28%~54% |
| Example 8 | 0.2BaSnO$_3$•0.8BNT | 1,065 | 9% | 3.9E12 | −52%~76% |
| Comparative Example 1 | BNT | 474 | 1.4% | 3.7E11 | −35%~62% |
| Comparative Example 5 | 0.3NaNbO$_3$•0.7BNT | 1,360 | 2.1% | 9.3E10 | −8%~32% |
| Comparative Example 6 | (Ba,Ca)Ti$_2$O$_5$ | 400 | — | 1.5E11 | −10%~11% |

The temperature characteristics of permittivity is represented by Equation 1. The temperature characteristics of permittivity are obtained by measurement of capacitance according to temperature.

TCC(%)=[(Capacitance at 200° C.−Capacitance at −55° C.)/Capacitance at −55° C.]×100    <Equation 1>

As shown in Table 2, the dielectric materials according to some embodiments, (for example those of Examples 3 and 5) exhibited a change in capacitance of −15% to 15% in the temperature range of −55° C. to 200° C. Accordingly, the dielectric materials of Example 3 and Example 5 exhibited stable temperature characteristics of permittivity. In comparison, the dielectric materials of Comparative Examples 1 to 3 had poor temperature characteristics of permittivity.

Evaluation Example 3: X-Ray Diffraction Experiment

To identify crystal structures of the dielectric materials according to compositions, X-ray diffraction patterns of the dielectric materials prepared in Examples 2, 6, 7, and 8 and Comparative Example 1 were measured. The results are shown in FIG. 3.

Figure 3:
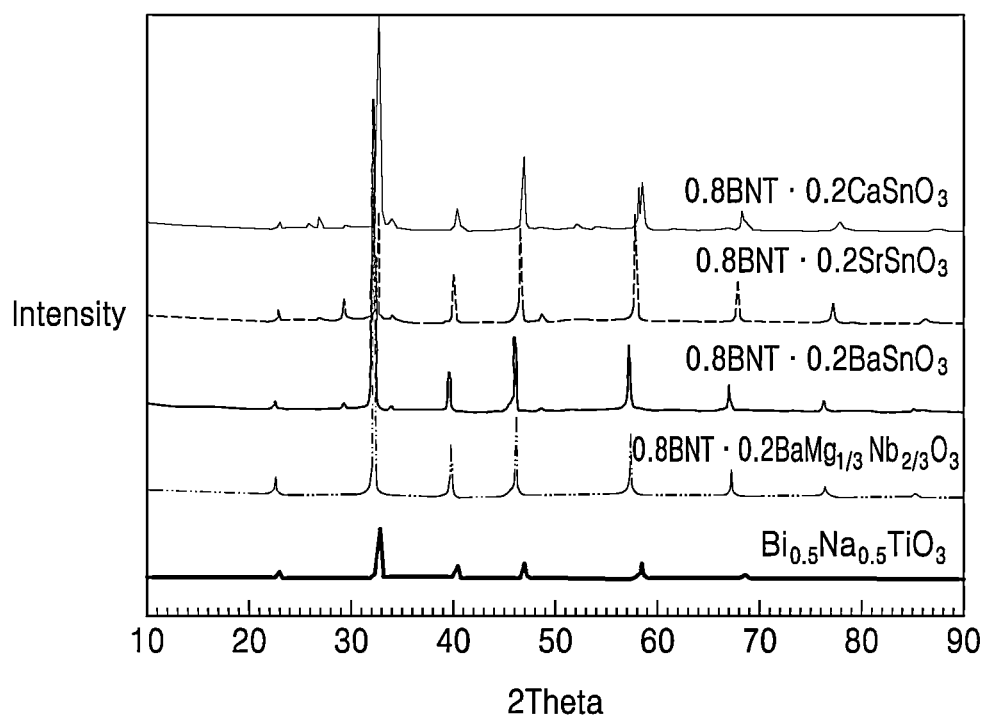
FIG. 3 shows results of X-ray diffraction pattern analysis of dielectric materials prepared in Examples 2, 6, 7, and 8 and Comparative Example 1.

As shown in FIG. 3, all the dielectric materials 0.2CaSnO$_3$.0.8BNT, 0.2SrSnO$_3$.0.8BNT, 0.2BaSnO$_3$.0.8BNT, and 0.2BaMg$_{1/3}$Nb$_{1/3}$O$_3$.0.8BNT exhibited, as a main phase, a monoclinic phase similar to that of BNT.

As shown in Table 3, the dielectric characteristics and resistivities of the dielectric materials of Examples 3, 6, and 7 were superior to those of the dielectric materials of Comparative Examples 1, 5, and 6 and exhibited stable temperature characteristics of permittivity. In particular, in the case where 20 mol % of CaSnO$_3$ was added to the composition of Bi$_{0.5}$Na$_{0.5}$TiO$_3$, a permittivity of 400 or greater, a resistivity of 1.0E12 (ohm*cm), and a temperature characteristic of −55~200° C. within ±15% were exhibited.

Evaluation Example 5: High-Electric Field Characteristic Evaluation

To identify high-electric field characteristic of the dielectric material according to composition, silver (Ag) was coated on the opposite surfaces of the pellets of the dielectric materials of Examples 1 to 8 and Comparative Examples 1 to 3 to form electrodes, and then permittivity was measured at room temperature (25° C.) using an E4980A Precision LCR Meter (Keysight) at a DC voltage of 87 kV/cm and a frequency of 1 kHz.

Figure 4:
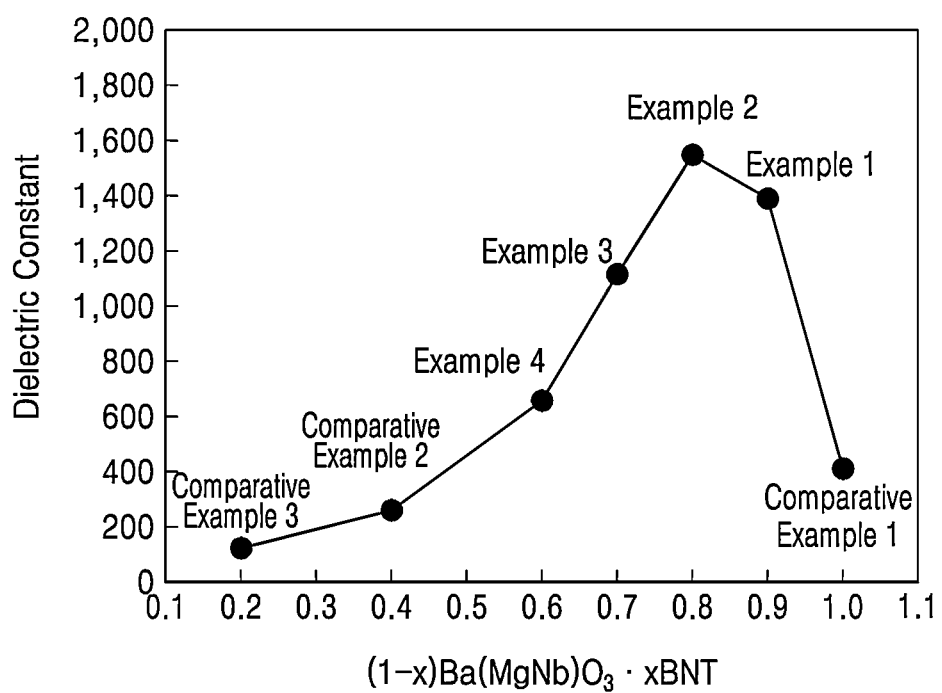
FIG. 4 is a graph showing results of evaluation of high-electric field characteristics in the dielectric materials of Examples 1 to 4 and Comparative Examples 1 to 3.

The results of measuring permittivities, a change in permittivity and residual polarization before and after high-voltage application are shown in Table 4, and partially in FIG. 4.

TABLE 4

| Example | Composition | ∈₀ (@ 1 kHz) (@dc = 0 kV/cm) | ∈ (@ 1 kHz) (@dc = 87 kV/cm) | Δ∈/∈₀ | Pr (μC/cm²) |
|---|---|---|---|---|---|
| Example 1 | 0.1BaMgNbO3•0.9BNT | 1,554 (tanδ 0.6%) | 1,388 (ρ: 3.7E11) | −10.6% | 3.469 |
| Example 2 | 0.2BaMgNbO3•0.8BNT | 1,635 (tanδ 4.3%) | 1,542 (ρ: 6.7E12) | −5.7% | 1.000 |
| Example 3 | 0.3BaMgNbO3•0.7BNT | 1,099 (tanδ 0.9%) | 1,110 (ρ: 3.9E12) | +1.0% | 0.171 |
| Example 4 | 0.4BaMgNbO3•0.6BNT | 651 (tanδ 0.4%) | 660 (ρ: 9.0E12) | +0.4% | 0.163 |
| Example 5 | 0.5BaMgNbO3•0.5BNT | 409 (tanδ 0.7%) | 412 (ρ: 1.5E12) | +0.4% | 0.03 |
| Example 6 | 0.2CaSnO3•0.8BNT | 566 (tanδ: 1.4%) | 562 (ρ: 5.0E12) | −0.7% | 0.21 |
| Example 7 | 0.2SrSnO3•0.8BNT | 711 (tanδ: 3.1%) | 700 (ρ: 1.1E12) | −1.6% | 0.67 |
| Example 8 | 0.2BaSnO3•0.8BNT | 1,065 (tanδ: 9%) | 1,050 (ρ: 1.8E12) | −1.4% | 0.95 |
| Comparative Example 1 | Bi₀.₅Na₀.₅TiO₃ (BNT) | 474 | 399 (ρ: 1.1E10) | −16% | 17.1 |
| Comparative Example 2 | 0.6BaMgNbO3•0.4BNT | 259 (tanδ 0.4%) | 258 (ρ: 1.3E13) | −0.4% | 0.022 |
| Comparative Example 3 | 0.8BaMgNbO3•0.2BNT | 123 (tanδ 0.7%) | 121 (ρ: 9.5E12) | −5% | 0.002 |
| Comparative Example 4 | 0.2NaNbO3•0.8BNT | 1,360 (tanδ: 2.1%) | 1,270 (ρ: 9.3E09) | −7% | 1.4 |

As shown in Table 4, it was found that the dielectric materials prepared in Examples 1 to 8 had superior high-electric field characteristic to those of the dielectric materials of Comparative Examples 1 to 3, and in particular, in the cases where 30-50 mol % of Ba(Mg$_{1/3}$Nb$_{2/3}$)O$_3$ or 20 mol % of CaSnO$_3$ was added to the composition of Bi$_{0.5}$Na$_{0.5}$TiO$_3$, the high-electric field characteristic was excellent.

The resulting permittivities at a high-electric field according to the composition ratio of Ba(Mg$_{1/3}$Nb$_{2/3}$)O$_3$ are shown in FIG. 4.

In addition, additional experiments of evaluating high-temperature, high-electric field characteristics of (1−x)(Ba, Sr,Ca)SnO$_3$.xBNT dielectric materials having different compositions as in Table 5 were performed, and the results are summarized in Table 5.

TABLE 5

| Composition | Dielectric characteristic | | | | | Temperature characteristic |
|---|---|---|---|---|---|---|
| | ε$_r$ (@ 1 kHz) (LCR meter) | ε₀ (@ 1 kHz) (@ dc = 0 kV/cm) | ε (@ 1 kHz) (@ dc = 87 kV/cm) | Δε/ε₀ | Pr (μC/cm²) | ΔC/C$_{RT}$ (@ −55~200° C.) |
| 0.1BaMgNbO3 · 0.9BNT | — | 1,554 (tanδ 0.6%) | 1,388 (ρ: 3.7E11) | −10.6% | 3.5 | −46%~63% |
| 0.2BaMgNbO3 · 0.8BNT | — | 1,534 (tanδ 5.9%) | 1,580 (ρ: 6.4E11) | 3.2% | 1.2 | −49%~3.5% |
| 0.3BaMgNbO3 · 0.7BNT | — | 1,099 (tanδ 0.9%) | 1,110 (ρ: 3.9E12) | 1.0% | 0.17 | −30%~−5% |
| 0.1BaSnO3 · 0.9BNT | 1,306 (tanδ 5.4%) | 1,173 | 1,050 (ρ: 1.6E12) | −10.5% | 3.57 | −43%~103% |
| 0.2BaSnO3 · 0.8BNT | 1,004 (tanδ 11%) | 1,065 | 1,050 (ρ: 1.8E12) | −1.4% | 0.95 | −52%~76% |
| 0.3BaSnO3 · 0.7BNT | 856 (tanδ 12%) | 935 | 905 (ρ: 6.2E12) | −3.2% | 0.51 | −55%~18% |
| 0.1SrSnO3 · 0.9BNT | 879 (tanδ 3.2%) | 846 | 853 (ρ: 1.8E12) | 0.8% | 2.19 | −28%~66% |
| 0.2SrSnO3 · 0.8BNT | 640 (tanδ 3.1%) | 711 | 700 (ρ: 6.8E11) | −1.6% | 0.67 | −28%~54% |
| 0.3SrSnO3 · 0.7BNT | 474 (tanδ 2.5%) | 488 | 495 (ρ: 2.3E12) | 1.4% | 0.22 | −24%~32% |
| 0.1CaSnO3 · 0.9BNT | 892 (tanδ 0.7%) | 838 | 819 (ρ: 4.2E12) | −2.3% | 0.15 | −7%~−10% |
| 0.2CaSnO3 · 0.8BNT | 450 (tanδ 1.4%) | 566 | 562 (ρ: 5.0E12) | −0.7% | 0.06 | 1%~−10% |

As described above, according to one or more embodiments, a dielectric material may exhibit a high permittivity and high-resistivity, and a significantly reduced change in permittivity, and thus may provide a device with improved dielectric characteristics. The dielectric material may be applied to high-temperature MLCCs for vehicles or special purposes, and also operate in a high-electric field region, and thus a device with high efficiency in accordance with thinning of the dielectric layer may be manufactured.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A dielectric material comprising a composite represented by Formula 1:

$$xAB_3 \cdot (1-x)(Bi_aNa_b)TiO_3 \quad \text{[Formula 1]}$$

wherein, in Formula 1, A is at least one element selected from lanthanum group elements, rare earth metal elements, or alkaline earth metal elements, B is at least one element selected from transition metal elements, 0.1≤x≤0.5, 0<a<1, 0<b<1, and a+b=1.

2. The dielectric material of claim 1, wherein,

A is at least one of barium (Ba), strontium (Sr), calcium (Ca), or a combination thereof, and B is at least one of nickel (Ni), palladium (Pd), lead (Pb), iron (Fe), iridium (Ir), cobalt (Co), rhodium (Rh), manganese (Mn), chromium (Cr), ruthenium (Ru), rhenium (Re), Tin (Sn), vanadium (V), Germanium (Ge), tungsten (W), zirconium (Zr), molybdenum (Mo), hafnium (Hf), uranium (U), niobium (Nb), thorium (Th), tantalum (Ta), bismuth (Bi), calcium (Ca), strontium (Sr), barium (Ba), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), magnesium (Mg), aluminum (Al), silicon (Si), scandium (Sc), zinc (Zn), gallium (Ga), rubidium (Rb), silver (Ag), cadmium (Cd), indium (In), antimony (Sb), platinum (Pt), gold (Au), lead (Pb), or a combination thereof.

3. The dielectric material of claim 1, wherein,
A is Ba, and
B is Mg, Nb, Zr, Ta, Fe, or a combination thereof.

4. The dielectric material of claim 1, wherein, x is 0.3 to 0.5.

5. The dielectric material of claim 1, wherein the composite is represented by Formula 2:

$$xBa(Mg_yNb_{1-y})O_3.(1-x)(Bi_aNa_b)TiO_3 \quad [Formula\ 2]$$

wherein, in Formula 2, $0.3 \leq x \leq 0.5$, $0<y<1$, $0<a<1$, $0<b<1$, and $a+b=1$.

6. The dielectric material of claim 1, wherein the composite is represented by Formula 3:

$$xBa(Mg_{1/3}Nb_{2/3})O_3.(1-x)(Bi_{0.5}Na_{0.5})TiO_3 \quad [Formula\ 3]$$

wherein, in Formula 3, $0.3 \leq x \leq 0.5$.

7. The dielectric material of claim 1, wherein the composite is represented by Formula 4:

$$xCaSnO_3.(1-x)(Bi_aNa_b)TiO_3 \quad [Formula\ 4]$$

wherein, in Formula 4, $0.1 \leq x \leq 0.5$, $0<a<1$, $0<b<1$, and $a+b=1$.

8. The dielectric material of claim 7, wherein, in Formula 4, x is 0.1 to 0.3.

9. The dielectric material of claim 1, wherein the composite is at least one of $xBa(Mg_cNb_d)O_3.(1-x)(Bi_aNa_b)TiO_3$, $xBa(Ga_cSb_d)O_3.(1-x)(Bi_aNa_b)TiO_3$, $xBa(Sc_cSb_d)O_3.(1-x)(Bi_aNa_b)TiO_3$, $xBa(La_cSb_d)O_3.(1-x)(Bi_aNa_b)TiO_3$, $xBa(B_cSb_d)O_3.(1-x)(Bi_aNa_b)TiO_3$, $xBa(Al_cSb_d)O_3.(1-x)(Bi_aNa_b)TiO_3$, $xBa(La_cSb_d)O_3.(1-x)(Bi_aNa_b)TiO_3$, $xBa(In_cSb_d)O_3.(1-x)(Bi_aNa_b)TiO_3$, $xBa(Y_cSb_d)O_3.(1-x)(Bi_aNa_b)TiO_3$, $xBa(Ce_cSb_d)O_3.(1-x)(Bi_aNa_b)TiO_3$, $xBa(Nd_cSb_d)O_3.(1-x)(Bi_aNa_b)TiO_3$, $xBa(Gd_cSb_d)O_3.(1-x)(Bi_aNa_b)TiO_3$, $xBa(Sm_cSb_d)O_3.(1-x)(Bi_aNa_b)TiO_3$, $xBa(Eu_cSb_d)O_3.(1-x)(Bi_aNa_b)TiO_3$, $xBa(Tb_cSb_d)O_3.(1-x)(Bi_aNa_b)TiO_3$, $xSr(Mg_cNb_d)O_3.(1-x)(Bi_aNa_b)TiO_3$, $xSr(Ga_cSb_d)O_3.(1-x)(Bi_aNa_b)TiO_3$, $xSr(Sc_cSb_d)O_3.(1-x)(Bi_aNa_b)TiO_3$, $xSr(La_cSb_d)O_3.(1-x)(Bi_aNa_b)TiO_3$, $xSr(B_cSb_d)O_3.(1-x)(Bi_aNa_b)TiO_3$, $xSr(Al_cSb_d)O_3.(1-x)(Bi_aNa_b)TiO_3$, $xSr(La_cSb_d)O_3.(1-x)(Bi_aNa_b)TiO_3$, $xSr(In_cSb_d)O_3.(1-x)(Bi_aNa_b)TiO_3$, $xSr(Y_cSb_d)O_3.(1-x)(Bi_aNa_b)TiO_3$, $xSr(Ce_cSb_d)O_3.(1-x)(Bi_aNa_b)TiO_3$, $xSr(Nd_cSb_d)O_3.(1-x)(Bi_aNa_b)TiO_3$, $xSr(Gd_cSb_d)O_3.(1-x)(Bi_aNa_b)TiO_3$, $xSr(Sm_cSb_d)O_3.(1-x)(Bi_aNa_b)TiO_3$, $xSr(Eu_cSb_d)O_3.(1-x)(Bi_aNa_b)TiO_3$, $xSr(Tb_cSb_d)O_3.(1-x)(Bi_aNa_b)TiO_3$, $xCa(Mg_cNb_d)O_3.(1-x)(Bi_aNa_b)TiO_3$, $xCa(Ga_cSb_d)O_3.(1-x)(Bi_aNa_b)TiO_3$, $xCa(Sc_cSb_d)O_3.(1-x)(Bi_aNa_b)TiO_3$, $xCa(La_cSb_d)O_3.(1-x)(Bi_aNa_b)TiO_3$, $xCa(B_cSb_d)O_3.(1-x)(Bi_aNa_b)TiO_3$, $xCa(Al_cSb_d)O_3.(1-x)(Bi_aNa_b)TiO_3$, $xCa(La_cSb_d)O_3.(1-x)(Bi_aNa_b)TiO_3$, $xCa(In_cSb_d)O_3.(1-x)(Bi_aNa_b)TiO_3$, $xCa(Y_cSb_d)O_3.(1-x)(Bi_aNa_b)TiO_3$, $xCa(Ce_cSb_d)O_3.(1-x)(Bi_aNa_b)TiO_3$, $xCa(Nd_cSb_d)O_3.(1-x)(Bi_aNa_b)TiO_3$, $xCa(Gd_cSb_d)O_3.(1-x)(Bi_aNa_b)TiO_3$, $xCa(Sm_cSb_d)O_3.(1-x)(Bi_aNa_b)TiO_3$, $xCa(Eu_cSb_d)O_3.(1-x)(Bi_aNa_b)TiO_3$, $xCa(Tb_cSb_d)O_3.(1-x)(Bi_aNa_b)TiO_3$, or a combination thereof, wherein, x is 0.1 to 0.5, $0<a<1$, $0<b<1$, $a+b=1$, $0<c<1$, $0<d<1$, and $c+d=1$.

10. The dielectric material of claim 9, wherein, $a=0.5$, $b=0.5$, $0<c<1$, $0<d<1$, and $c+d=1$.

11. The dielectric material of claim 1, wherein the composite has a composite phase crystal structure including one or more selected from a rhombohedral phase, an orthorhombic phase, a cubic phase, or a tetragonal phase.

12. The dielectric material of claim 1, wherein, in the composite is a solid solution including $ABO_3$ and $(Bi_aNa_b)TiO_3$.

13. The dielectric material of claim 1, wherein the composite has a permittivity of 400 or greater at 1 kHz to 1 MHz.

14. The dielectric material of claim 1, wherein the composite has a resistivity of 1.0E12 Ωcm or greater.

15. The dielectric material of claim 1, wherein the composite exhibits a capacitance change of −15% to 15% in a temperature range of −55° C. to 200° C.

16. A device comprising:
a first electrode;
a second electrode facing the first electrode; and
a dielectric layer between the first electrode and the second electrode,
wherein the dielectric layer comprises the dielectric material according to claim 1.

17. The device of claim 16, wherein the device is a capacitor.

18. The device of claim 16, wherein the device is a multi-layered capacitor in which the first electrode, the dielectric layer, and the second electrode are sequentially stacked, and on the second electrode, the dielectric layer and the second electrode are repeatedly and alternately stacked.

19. A multi-layered capacitor comprising;
a plurality of internal electrodes; and
dielectric layers alternately stacked between the plurality of internal electrodes,
wherein the dielectric layers comprise the dielectric material according to claim 1.

20. A method of preparing a dielectric material of claim 1, the method comprising:
mechanically milling a mixture of an A compound, a B compound, a Bi compound, a Na compound, and a Ti compound; and
performing a first heat treatment under an oxidizing atmosphere.

21. The method of claim 20, wherein the first heat treatment is performed at 600° C. to 1000° C.

22. The method of claim 20, further comprising:
after the first heat treatment under an oxidizing atmosphere,
molding a molded body using a product from the first heat treatment; and
performing a second heat treatment on the molded body.

23. The method of claim 22, wherein the second heat treatment is performed at 1000° C. to 1600° C.

24. The method of claim 20, wherein the mechanical milling is at least one of ball milling, airjet milling, bead milling, roll milling, hand milling, high-energy ball milling, planetary milling, stirred ball milling, vibrating milling, mechanofusion milling, shaker milling, attritor milling, disk milling, shape milling, nauta milling, nobilta milling, high-speed mixing, or a combination thereof.

25. The method of claim 20, wherein the mechanical milling comprises wet-milling using a solvent.

* * * * *